Feb. 13, 1962 F. G. VON KUMMER 3,021,063
PARITY CHECK APPARATUS
Filed Feb. 23, 1960
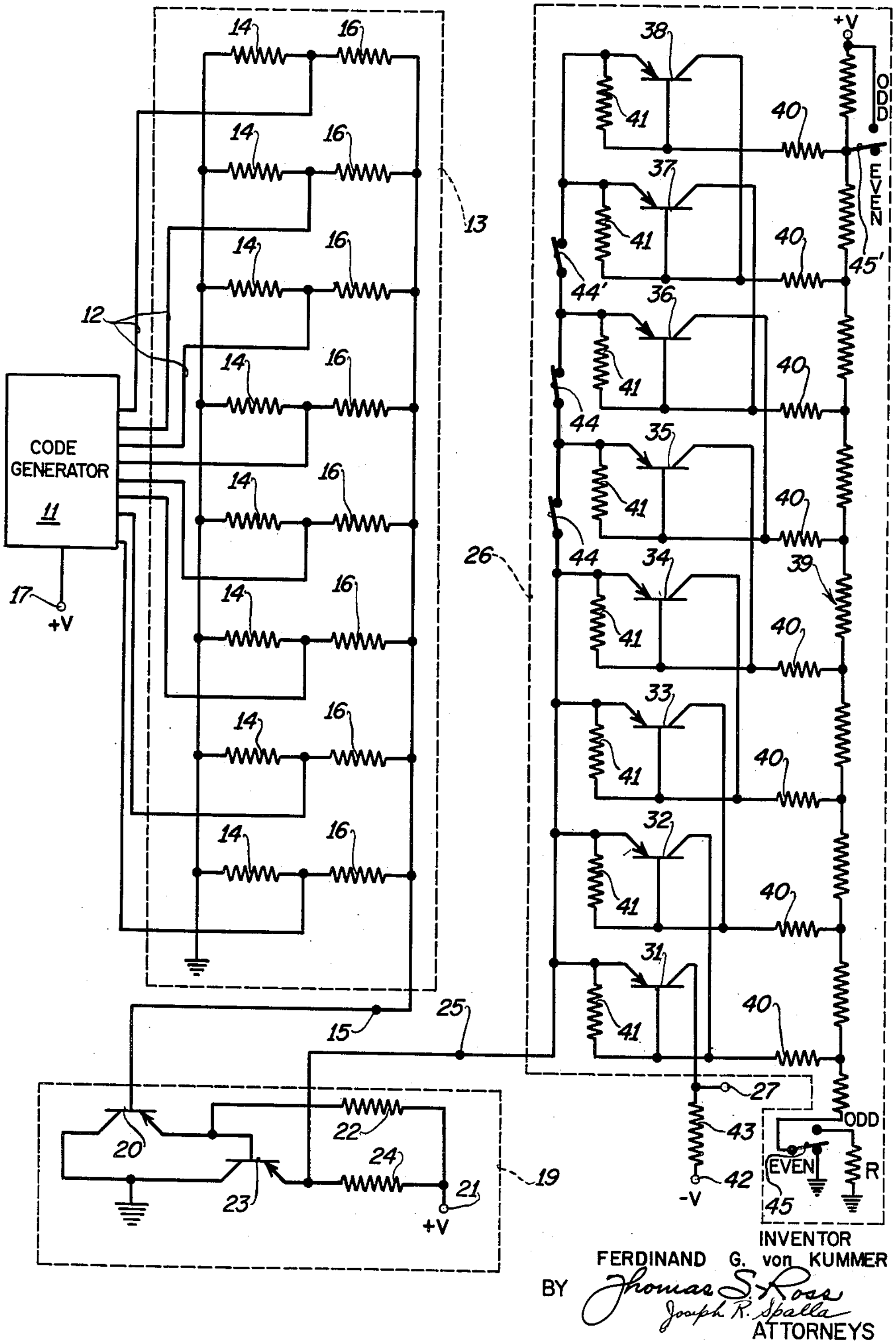
INVENTOR
FERDINAND G. von KUMMER
BY Thomas S. Ross
Joseph R. Spalla
ATTORNEYS United States Patent Office 3,021,063
Patented Feb. 13, 1962

3,021,063

PARITY CHECK APPARATUS

Ferdinand G. von Kummer, Bloomfield, Conn., assignor to Royal McBee Corporation, Port Chester, N.Y., a corporation of New York Filed Feb. 23, 1960, Ser. No. 10,130
4 Claims. (Cl. 235—153)

This invention relates to apparatus for indicating errors in $n$ digit binary code patterns employing a parity bit to make the sum of "one" bits even or odd; more particularly it relates to a parity check apparatus provided with circuitry for converting binary digit code patterns into signals proportional to the number of "one" bits in the code patterns; and specifically it relates to a parity check apparatus employing circuitry for detecting only those signals which are proportional to predetermined numbers of "one" bits in the code patterns.

Known parity check apparatuses employ serializers and counters or "exclusive or" circuits. These apparatuses are parts consuming and rather complicated due in part to the necessity for supplying extra logic to distinguish "blank" and "delete" codes from codes in error in checking for example, odd bit codes, e.g. the six+one alphanumeric code, for even parity. As is understood in the art a blank code is one wherein all the bits are in a "zero" state and a delete code is one wherein all of the bits are in a "one" state.

In accordance with the invention there is provided an apparatus constructed with a minimum of components and whose logic is such that it is adaptable to check any $n$ bit code, whether $n$ is odd or even, for odd or even parity. Briefly the present invention comprises a conversion unit which develops an output signal whose magnitude is proportional to the number of "one" bits in a code pattern; the bits in the code pattern being applied to the conversion unit in parallel. The output signal from the conversion unit is applied to an amplitude responsive circuit which produces an error signal only in response to predetermined signal amplitudes representative of odd or even numbers of "one" bits in the code, depending respectively on whether the apparatus is employed to make an even or an odd parity check.

A novel feature of the invention resides in the fact that the basic logic of the apparatus is inherently adapted to distinguish between "blank" and "delete" codes and codes in error when checking an odd bit code for even parity.

An object of the inveniton is to provide a novel parity check apparatus of simple logic and constructed with a minimum of components.

Another object of the invention is to provide a digital conversion unit whose signal output increases in proportion of the number of "one" bits in an $n$ digit binary code pattern.

Another object of the invention is to provide a signal amplitude responsive circuit which discriminates between amplitudes representative of odd and even numbers of "one" bits in $n$ digit binary code patterns.

Still another object of the invention is in the provision of apparatus for checking an $n$ bit code for even parity, where $n$ is odd, which permits the recognition of an all "one" bit or delete code as an artificial even code pattern rather than as an error in a simple manner.

A further object of the invention is in the provision of apparatus for checking an $n$ bit code for odd parity, where $n$ is odd, which permits the recognition of an all "zero" bit or blank code as an artificial odd code rather than as an error in a simple manner.

A still further object of the invention is in the provision of apparatus for checking even bit codes for odd parity which permits the recognition of delete and blank codes as artificial odd codes rather than as errors in a simple manner.

Still another object of the invention is in the provision of a parity check apparatus employing only passive and solid state elements.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

The single FIGURE of the drawings is a schematic diagram of a parity check apparatus in accordance with the invention.

Referring to the drawing there is shown a generator 11 of an $n$ binary digit code, where $n$ may be odd or even, which the present invention can check for odd or even parity as will hereinafter appear.

It is to be noted here that an odd parity check circuit is required to indicate an error if the sum of the "one" bits in a code is even with the exception of the zero "one" bit or blank code in an odd or an even digit code and the all "one" bit code in an even bit code, and that an even parity check circuit is required to indicate an error when the sum of the "one" bits is odd, with the exception of the all "one" bit code in an odd digit binary code. As will be appreciated by those conversant in the art, generator 11 may comprise a reader, computer or keyboard encoding device whose output is an $n$ digit binary code, each digit of which is represented electrically by a signal or no signal condition, or signals of a first or a second polarity, designated herein as "zero" bit or "one" bit signals. As will be understood the generated binary digits comprising a character representation will appear simultaneously on parallel lines 12.

The exemplary circuit shown is adapted to check codes having up to eight bits for odd or even parity. Hence eight bit lines are shown emanating from generator 11. As will be understood when the number of bits in the code is odd, the all "one" bit delete code will always be odd and when the number of bits in the code is even the delete code will always be even.

As seen in the figure the bit output lines 12 are connected to a conversion unit 13 which converts the bit input information into a voltage whose magnitude is proportional to the number of "one" bits in the code. More particularly each bit output line is connected to ground through an associated resistor 14, and to an output terminal 15 through an associated resistor 16. As is apparent the above arrangement comprises a ladder type network; "one" bits causing current to flow from a common positive voltage source 17 at the code generator to ground; and a positive signal voltage to be developed at terminal 15 whose amplitude will vary in accordance with the number of "one" bits on lines 12, i.e. the more "one" bits in the code the higher the signal amplitude.

Terminal 15 is connected to an impedance matching network 19. More particularly terminal 15 is connected to the base of a medium power pnp transistor 20 whose collector is returned to ground and whose emitter is connected to a positive source terminal 21, which is of the same magnitude as source 17, through resistor 22. The base of a second pnp power transistor 23 is connected across resistor 22 and has its collector returned to ground and its emitter connected to positive source terminal 21 through resistor 24. As is apparent transistors 20 and 23 are cascaded emitter followers. The voltage developed across emitter resistor 24 is applied via terminal 25 to an amplitude discriminating circuit, generally designated by reference numeral 26.

The amplitude discriminating circuit comprises a chain of transistor stages. The number of transistor stages is determined in accordance with the following formulae. Where it is desired to check an $n$ bit code for odd or even parity, and $n$ is odd, the number of stages required will be $n-1$. Where it is desired to check an $n$ bit code for odd parity, and $n$ is even, the number of stages required will be $n-2$. Also if the number of bits, $n$, in a code is even, and an even parity check is desired, the number of stages required will be $n$.

In accordance with the embodiment of a circuit adapted to check the parity of codes having up to eight bits therefore, eight stages, 31–38 are shown. The base bias levels of transistors 31–38 are set in an ascending bias order by connecting the bases of each transistor to a different point of a voltage divider, generally designated by reference numeral 39, through resistors 40 all of which are of the same magnitude. For reasons which will hereinafter be apparent, the bias levels on all of the transistors are adapted to be changed simultaneously to higher positive values by movement of ganged form $c$ switches 45 and 45'. The signal from the impedance matching network is connected simultaneously to the emitters of all of the transistors and to the bases of all of the transistors through resistors 41, all of which are of the same magnitude. The collector of transistor 31 is connected to a negative voltage source terminal 42 through a load resistor 43 whereby an output signal may be taken from output terminal 27. As seen from the drawing the collector of transistor 32 is connected to the base of transistor 31, as are the collectors of transistors 33, 34, 35, 36, 37 and 38 respectively, to the bases of immediately preceding transistors 32, 33, 34, 35, 36 and 37.

The base bias levels are so set by the voltage divider 39 that each of the transistors 31–38 respectively, will conduct only when the signal magnitude applied to the emitters exceeds their respective base bias levels i.e. each will conduct when its emitter becomes positive with respect to its base. For example, when an even parity check is to be made switches 45 and 45' will be in the positions shown thereby setting the base bias levels such that the signal amplitude resulting from a "one" bit on one or more bit lines will overcome the static base bias on transistor 31; the signal amplitude resulting from "one" bits on two or more bit lines will be of sufficient amplitude to overcome the static base bias on transistors 31 and 32, the signal amplitude resulting from "one" bits on three or more bit lines will overcome the static base bias on transistors 31, 32 and 33, etc.

Due to the connection of the collectors of transistors 32–38 to the bases of preceding transistors 31–37 respectively, in the chain, it is evident that the base bias of the transistors 31–37 respectively in the chain will each be influenced by the conduction of the transistor immediately above it in the chain. For example, conduction of transistor 38 will raise the bias on transistor 37 beyond cut off despite the presence of a signal amplitude sufficient to overcome the static bias on the transistor 37. Similarly conduction of 36 will raise the bias on 35 beyond cut off; conduction of 34 will raise the bias on 33 beyond cut off, etc.

The operation of the parity check system will be more evident upon consideration of the following examples. Suppose the code generated has seven bits, the seventh "bit" being employed to make the number of "one" bits in each pattern even. As stated above $n-1$ or $7-1$ stages are required to make an even or an odd parity check on an odd digit code. Since only six stages are required a switch 44' between stages 36 and 37 in the chain will be open to cut out stages 37 and 38. With no "one" bits on any of the bit lines 12 (blank code), terminal 15 will present ground potential to the base of transistor 20 which will conduct appreciably thereby causing its emitter and consequently the base of transistor 23 to assume substantially ground potential; with the result that transistor 23 will also conduct appreciably and its emitter and terminal 25 to assume a potential only slightly above ground potential. With terminal 25 only slightly above ground potential, transistors 31–36 will all be held in a non-conducting state due to the positive bias on the bases thereof effected by connection to the voltage divider 39. Assume now that one of the bit lines 12 carries a "one" signal. This will raise the potential of terminal 15 to a value between ground and $+v$, thereby causing conduction through transistor 20 and consequently transistor 23 to decrease proportionally. The decrease in conduction of transistor 23 will cause the potential on terminal 25 to rise toward $+v$ to a value, as determined by the circuit parameters, which is greater than the positive potential on the base of transistor 31, thereby causing the latter to conduct and a signal which is indicative of an odd number of "one" bits on lines 12 to be developed across load resistor 43.

Assuming that two of lines 12 carry "one" bits, terminal 15 will become more positive, conduction through emitter follower 20 and 23 will decrease proportionally and terminal 25 will become more positive i.e. will assume a potential greater in magnitude than the positive bias on the base of transistor 32 causing it to conduct. Conduction of transistor 32 will render the base of transistor 31 more positive than its emitter, cutting it off, with the result that no signal will be developed across resistor 43. This condition will be indicative of an even number of "one" bits on lines 12.

Assuming that three of the lines 12 carry "one" bits, terminal 25 will rise further toward $+v$ to a potential whose magnitude exceeds the potential on the base of transistor 33 thereby causing it to conduct. Conduction of transistor 33 will increase the positive bias potential on the base of transistor 32 such that it becomes positive with respect to its emitter, cutting transistor 32 off. With transistor 32 cut off, transistor 31 will be rendered conductive by the signal on terminal 25, thereby developing a voltage across resistor 43 indicative of an odd parity. In similar fashion 4 "one" bits on lines 12 will render transistors 34 and 32 conductive, 5 "one" bits on lines 12 will render transistors 35, 33, and 31 conductive, and six or seven "one" bits will render transistors 36, 34 and 32 conductive.

It is to be noted here that a seven "one" bit combination or delete code in a six+1 bit alphanumeric code, though odd, is recognized as an artificial even rather than as an error in a facile manner, i.e. a signal proportional to a seven "one" bit code merely renders transistor 36 more conductive.

Suppose again that the code generated has seven bits but that the seventh bit was employed to make the number of "one" bits in each pattern odd. As stated above $n-1$ stages will again be required. To check for odd parity however switches 45 and 45' will be moved to the position designated odd.

When switches 45 and 45' are in the position designated odd, the bias level on transistor 31 is raised by an amount such that a signal proportional to two "one" bits is required to render it conducting. Similarly, signals proportional to three, four, five, six and seven "one" bits are required to render transistors 32–36, respectively, conductive. Hence, neither a blank code nor a single "one" bit code will render transistor 31 conductive. A two "one" bit code will render 31 conductive, a three "one" bit code transistor 32 conductive and 31 nonconductive, etc. i.e. the chain will operate as before. Even "one" bit codes, with the exception of the blank code which is recognized as an artificial odd code, produce an error signal; odd bit codes, no error signal.

If an $n$ bit code, where $n$ is even, is to be checked for even parity the number of transistor stages required is $n$ or eight, assuming an 8 digit code.

In this case switches 45 and 45' will be in even position and switch 44' closed. In operation then odd one bit codes 1, 3, 5 and 7 will produce an error signal; blank and even "one" bit codes, 2, 4, 6 and 8 (delete), no error.

If odd parity of an even digit code, again assuming eight, is to be checked, switches 45 and 45' will be moved to odd position and switch 44' will be opened since as before stated only $n-2$ stages are necessary to make an odd check of an $n$ digit code where $n$ is even. In this setup, codes having 2, 4 and 6 "one" bits will produce an error signal; blank and codes having 1, 3, 5, 7 and 8 (delete) "one" bits will not. Here as in the even check of an odd bit (seven) code, transistor 36 (the last effective transistor in the chain rendered conductive by a seven "one" bit code) will merely increase its conduction in response to an eight "one" bit (delete) code and thereby be ineffective.

Obviously where $n$ digit codes other than 7 and 8 are being checked different ones of switches 44 will be opened as required by hereinbefore noted formulae.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. Apparatus for checking code patterns having $n$ binary digits for odd or even parity comprising,
   - means collectively responsive to said code patterns for developing output signals whose amplitudes are directly related to the number of "one" bits in said code patterns,
   - a chain of $n$ electronic amplifying elements,
   - means for biasing said elements off in an ascending degree from the lowest to the highest element in the chain such that the lowest element in the chain will conduct in response to output signals of at least a predetermined amplitude and elements higher in the chain will conduct in response to output signal amplitudes representative of code patterns having progressively more "one" bits than the number resulting in said predetermined amplitude signal,
   - means connecting each of the elements in the chain to its immediately preceding element whereby conduction of an element in the chain prevents conduction of its immediately preceding element,
   - means for applying said output signals simultaneously to all of said elements in said chain,
   - and means for deriving an output from the lowest element in the chain when the parity of a code pattern is incorrect.

2. Apparatus as recited in 1 where $n$ is odd and the evenness of "one" bits in the patterns determines the correctness of the patterns further comprising,
   - means for rendering the highest element in the chain ineffective.

3. Apparatus as recited in 1 wherein $n$ is odd and the oddness of "one" bits in the patterns determines the correctness of the pattern further comprising,
   - means for rendering the highest element in the chain ineffective,
   - and means for increasing the bias on all the elements in the chain by an amount corresponding to one "one" bit amplitude.

4. Apparatus as recited in claim 1 where $n$ is even and the oddness of "one" bits in the patterns determines the correctness of the pattern further comprising,
   - means for rendering the two highest elements in the chain ineffective,
   - and means for increasing the bias on all the elements in the chain by an amount corresponding to one "one" bit signal amplitude.

References Cited in the file of this patent

UNITED STATES PATENTS

| | | |
|---|---|---|
| 2,486,390 | Cunningham | Nov. 1, 1949 |
| 2,784,907 | Williams et al. | Mar. 12, 1957 |
| 2,892,147 | Bell | June 23, 1959 |